Jan. 13, 1931. L. S. CHADWICK ET AL 1,789,066
REFRIGERATOR
Filed July 19, 1928 3 Sheets-Sheet 3
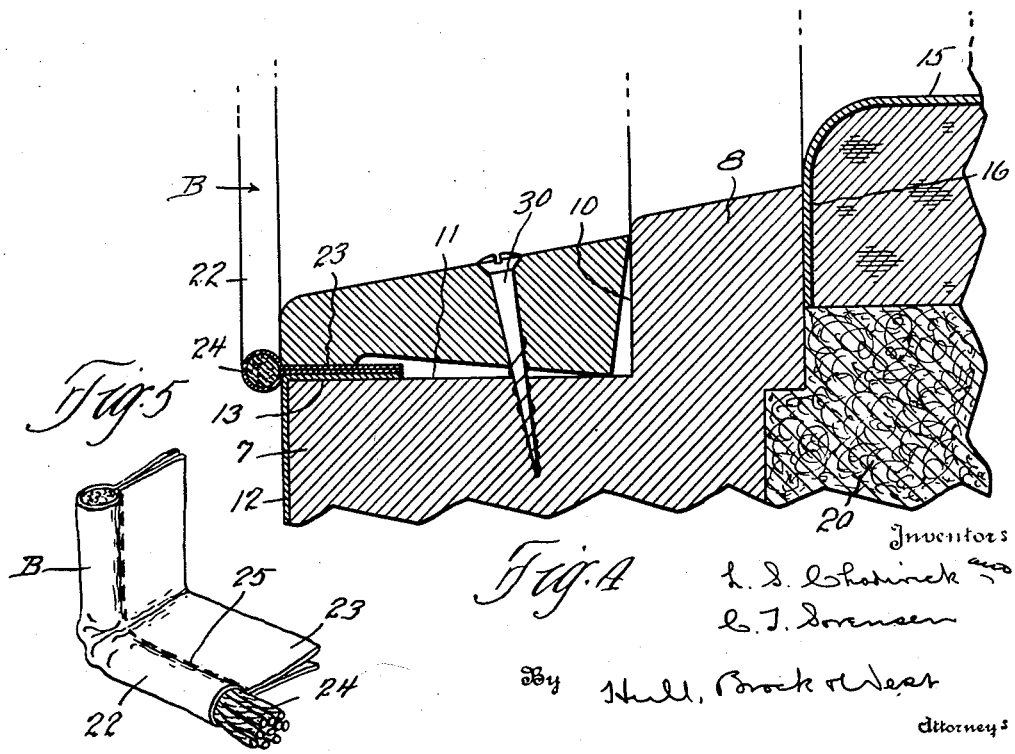

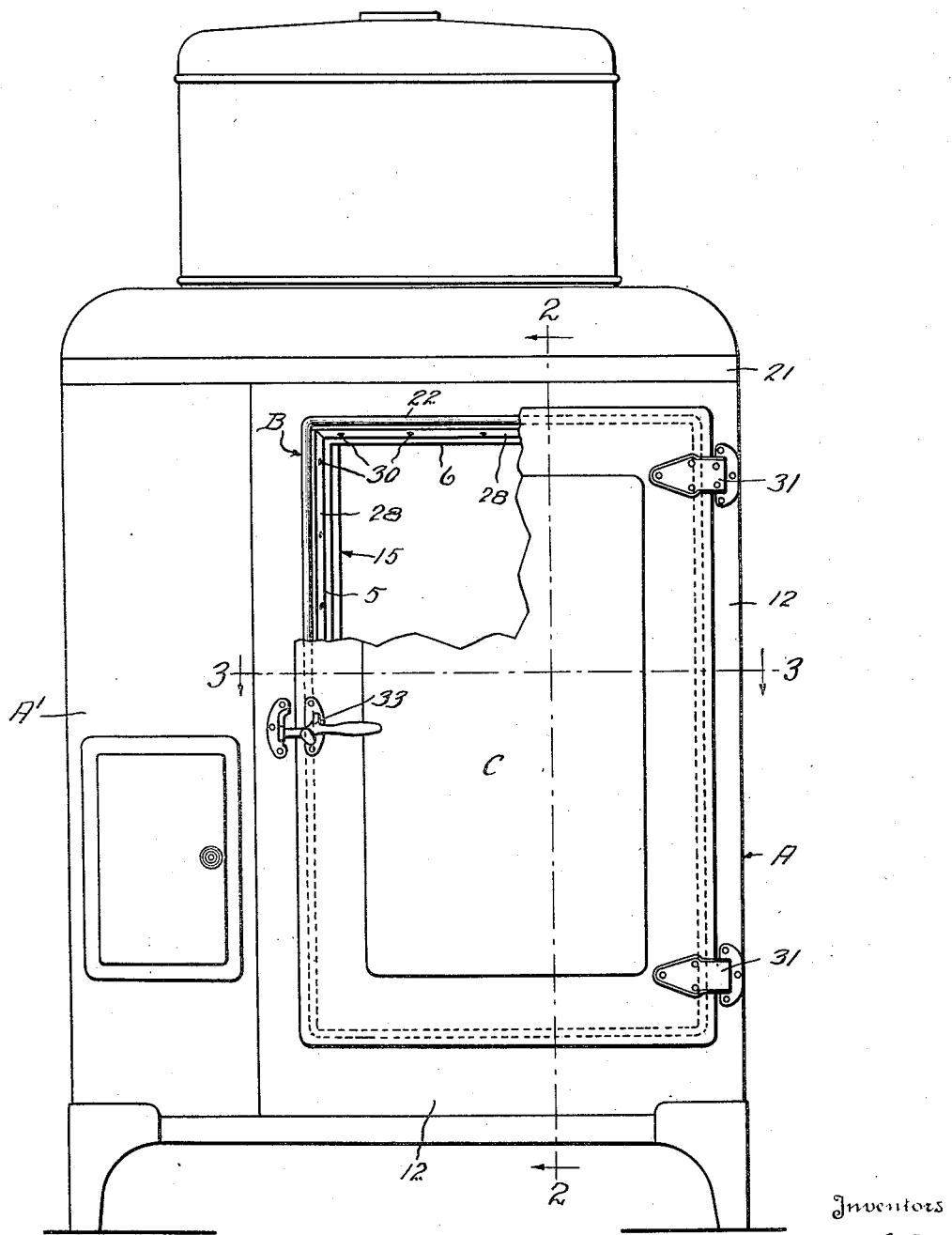

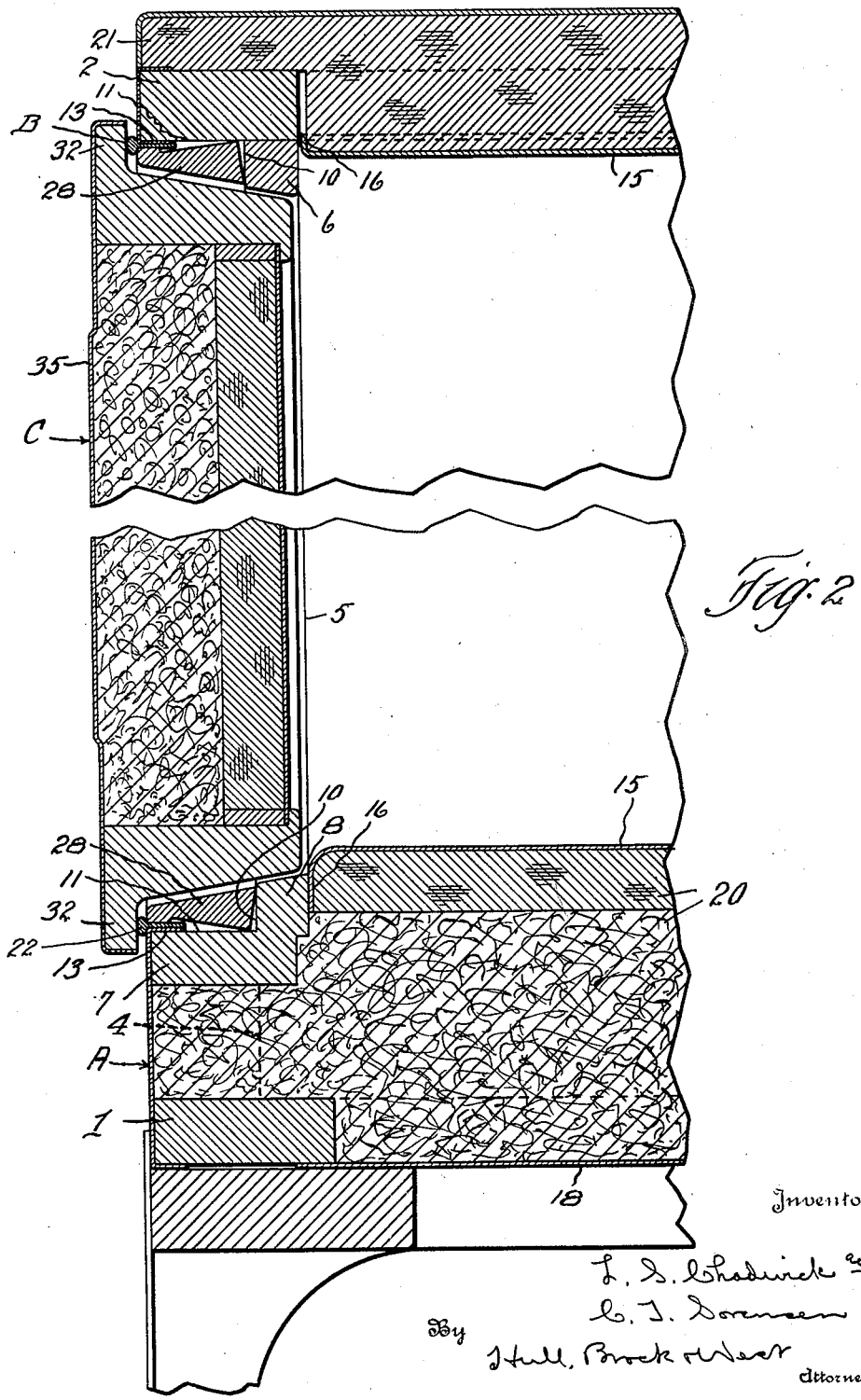

Patented Jan. 13, 1931

1,789,066

UNITED STATES PATENT OFFICE

LEE S. CHADWICK, OF SHAKER HEIGHTS, AND CLARENCE T. SORENSEN, OF LAKEWOOD, OHIO, ASSIGNORS TO PERFECTION STOVE COMPANY, OF CLEVELAND, OHIO, A CORPORATION OF OHIO

REFRIGERATOR

Application filed July 19, 1928. Serial No. 293,829.

This invention relates to improvements in the construction of refrigerators, and more especially as it has to do with means for sealing the joint between the door and cabinet.

Incidentally, the present invention was devised in connection with cabinets for so-called "iceless" refrigerators of the intermittent absorption type, such as those disclosed in the co-pending applications of David F. Keith, Serial No. 242,574, and Marc Resek, Serial No. 262,351, filed, respectively, on December 27, 1927 and March 17, 1928, and the invention is herein disclosed as incorporated in a cabinet for refrigeration apparatus of this class. It is to be understood, however, that our improvements are not restricted to use with refrigeration apparatus of the class referred to, but are applicable to all varieties of refrigerators.

Heretofore, gaskets have been attached to the doors of refrigerators by means of staples or the like, and such fastening means rust and become unsightly as well as unreliable. Furthermore, by the use of such fastening means, the gasket is held only at intervals and unless the gasket is stretched very tightly, and retains its original tautness, it will sag between adjacent fastening means.

It is an object of our invention to provide a construction by which the foregoing difficulties are obviated and wherein the gasket is firmly clamped in place continuously throughout its length by means more durable and more convenient of use than the fastening means previously employed.

A type of gasket commonly used, and employed by us in our present invention, consists of a compressible bead having an attaching flap extending from one side thereof. According to the prevailing method of attachment, the gasket is applied to a flat surface, all parts of which are in the same plane, and such an arrangement necessitates folding, crimping or cutting the flap adjacent the corners of the door. In our improved structure the flap is disposed at right angles to the plane of the door opening, which enables it to be turned or bent at the corners along straight transverse lines and without the need of cutting, crimping or puckering it.

Features of the invention more fundamental than those above set forth, are the placing of the gasket on the body of the cabinet about the door opening, in contradistinction to the prior practices of applying it to the door, and the interposition of the attaching part of the gasket between portions of the structure subjected, respectively, to the interior and exterior temperatures of the refrigerator. Advantages arising from these features are the insulation of said portions from each other and consequently the maintenance of a lower temperature in the refrigerator by preventing appreciable heat interchange between the exterior and interior of the cabinet; the prevention of condensation and frost formation on the surface of the cabinet immediately outside the gasket; and the superior facilities afforded by the body structure of the cabinet, over that of the door, for a proper installation of the gasket.

Further and more specific objects of the invention will become apparent as we proceed to describe in detail the embodiment illustrated in the accompanying drawings wherein similar reference characters designate corresponding parts throughout the several views.

In the drawings, Fig. 1 is a front elevation of a refrigerator incorporating our invention; Figs. 2 and 3 are, respectively, a vertical section and a horizontal section through the cabinet, on a scale considerably enlarged over that of Fig. 1, the planes of section being designated by the respective lines 2—2 and 3—3 of Fig. 1; Fig. 4 is a further enlarged sectional detail showing the manner of clamping the gasket in place; and Fig. 5 is a fragmentary perspective view of the gasket, showing the manner in which it is bent adjacent the corners of the door opening.

The structural details of the cabinet constitute no part of our present invention excepting as they contribute to the attachment of the gasket, wherefore, the following brief description of the same will suffice for the present disclosure.

The body portion of the cabinet is designated generally by the reference character A, and the skeleton structure thereof is made up of a rectangular bottom frame 1, a similar top frame 2, and vertical posts that connect the corners of the two frames, only those at the front being shown. These appear in Fig. 3 and are designated by the numeral 4, while one is shown in dotted lines in Fig. 2.

Strips 5 (Fig. 3) are secured to the rear faces of the corners posts 4 and overhang their inner edges a material distance; and a batten 6 (Fig. 2) is applied to the underneath surface of the front member of the top frame 2 adjacent its rear edge and lies in the same vertical plane as the strips 5. Supported by and between the corner posts 4 a suitable distance above the bottom frame 1 is a cross member 7 that has a vertical offset portion 8 along its rear edge which, like the batten 6, is in the same vertical plane as the strips 5. The inner inclined surfaces of the strips 5, batten 6 and portion 8 of the cross member 7 define the door opening of the cabinet, and their front, vertically disposed surfaces may be referred to, for the purpose of the present description, as abutments 10. The surfaces of the top frame 2, corner posts 4, and cross member 7, forwardly of the abutments 10 and which are disposed at right angles to the plane of the door opening, may be called, for convenience of description, the gasket supporting faces 11.

The skeleton structure of the cabinet is enclosed by a sheet metal covering 12 that extends over the front sides of the corner posts 4 and front members of the bottom and top frames 1 and 2, respectively, and over the corresponding surface of the cross member 7, said covering being flanged inwardly about the door opening and in contact with the gasket supporting faces 11, as indicated at 13.

A sheet metal shell 15 constitutes the lining of the cabinet and its open front is surrounded by a flange 16 that is engaged with the rear faces of the batten 6, strips 5, and portion 8 of the cross member 7. A plate 18 is secured to the underneath surface of the bottom frame 1 and closes the opening thereof, and a plate 19 is extended between the front and rear corner posts on the left hand side of the cabinet, as the same is viewed from the front. This latter detail is adopted when the cabinet is to be used for refrigeration apparatus of the class hereinbefore referred to and which involves heating means housed within a casing, designated A' in Fig. 1, applied to the left hand side of the cabinet. Otherwise, the covering 12 could be extended entirely about the body portion of the cabinet. The space between the shell or lining 15 and the sheet metal covering of the cabinet is packed with suitable insulating material, designated 20. A suitably constructed and insulated top 21 is fitted to the frame 2, and has a portion extending downwardly through said frame and into contact with the top of the shell 15.

The gasket, designated generally by the reference character B, and shown in detail in Fig. 5, comprises a compressible bead 22 and an attaching flap 23. This gasket, which is of a type of our present selection, is made up of a relatively soft, pliable, multiple-strand cord 24 about which is wrapped a strip of flexible material, such as rubberized fabric, that is stitched at 25 (Fig. 5) adjacent the cord to form an envelope or sheath therefor, the contiguous edge portions of the strip of material beyond the stitches 25 constituting the attaching flap 23. In the installation of the gasket, the flap 23 is applied to the gasket supporting faces 11 of the door frame (or, more accurately speaking, to the flanged edges 13 of the cover 12 that overlie said faces) and the front edges of clamping strips 28 are then engaged with the flap 23 while the inner edges of said strips are disposed within the angle between the abutments 10 and the faces 11. It is to be noted that the strips 28 are of such shape in cross section that their rear surfaces are inclined to the abutments 10 and their outer surfaces are similarly disposed to the faces 11 so that the bearing of said strips on said parts is reduced to substantially line contact. However, the clamping strips are designed to afford considerable surface bearing on the attaching flap 23 of the gasket. Screws 30 are engaged through the clamping strips and are driven into the door frame for binding the strips in place, and by reason of the cross sectional shape of the strips, and the manner of their engagement with the abutments 10 and faces 11, the strips may be placed under tension by drawing down firmly on the screws 30 so as to more effectively clamp the gasket in place and allow for some degree of contraction, expansion, or other change in the parts without impairing the clamping action.

The door C is made of a size and shape to loosely fit within the door opening of the cabinet and is connected to the cabinet by hinges 31. The door is formed with a peripheral overhang 32 for contact with the bead 22 of the gasket B and said bead is compressed between said overhang and the opposed surface of the cabinet when the door is drawn firmly to closed position by means of the latch 33.

In order to reduce to the minimum, heat interchange between the exterior and interior of the refrigerator, continuity of metal between these regions is avoided. To this end, the edge portion of the door structure, the clamping strips 28, and the elements that make up the door frame, are preferably of wood; and it will be noted that the metal plate 35 that is applied to the outer side of the door extends only about the peripheral portion of the overhang 32.

Having thus described our invention, what we claim is:

1. In a refrigerator, the combination of a cabinet having a door opening and provided with a gasket supporting face surrounding said opening, resilient clamping means in opposed relation to said face, a gasket having an attaching portion interposed between said gasket supporting face and the clamping means, fastening means urging the clamping means toward said face for holding the latter means under tension, and a door for closing the aforesaid opening, the gasket having a part arranged to be engaged by the peripheral portion of the door.

2. In a refrigerator, the combination of a cabinet having a door opening surrounded by a gasket supporting face that is at substantially right angles to the plane of the door opening and an abutment surrounding the door opening inwardly of the gasket supporting face and in a plane substantially parallel to that of the door opening, a gasket surrounding the door opening and having an attaching flap applied to said gasket supporting face, clamping strips having parts for contact with the attaching flap of the gasket and parts for substantially line contact with the abutment and with the gasket supporting face inwardly of the gasket, fastening means engaged through the clamping strips for urging them toward the gasket supporting face, and a door for closing the aforesaid opening, the gasket having a bead arranged to be engaged by the peripheral portion of the door.

3. In a refrigerator, the combination of a cabinet having a door opening, a sheet metal covering for the cabinet having an edge portion surrounding said opening, a gasket of insulating material having an attaching part engaged with said edge portion of the covering, clamping elements of non-heat conducting material applied to the attaching part of the gasket, means for urging the clamping elements toward the gasket, and a door for closing the aforesaid opening, the gasket having a part wherewith the peripheral portion of the door is arranged to engage.

4. In a refrigerator, the combination of a cabinet having a door opening, a sheet metal covering for the cabinet that is flanged inwardly about said opening, a gasket of insulating material having an attaching flap engaged with the inwardly flanged portion of the covering, an abutment surrounding the door opening inwardly of the gasket, clamping strips having parts engaged with the gasket and with the abutment, fastening means for urging the clamping strips toward the gasket, and a door for closing the aforesaid opening, the gasket having a compressible part wherewith the peripheral portion of the door is arranged to engage.

5. A refrigerator comprising two major units consisting, respectively, of a cabinet having a door opening, and a door for closing said opening; a gasket having a portion arranged to be compressed between the peripheral portion of the door and the cabinet, one of said units having a gasket supporting face that is at substantially right angles to the plane of the door opening, and an abutment contiguous to the gasket supporting face and in a plane substantially parallel to that of the door opening, the gasket having an attaching flap applied to the gasket supporting face, clamping strips having parts for contact with the attaching flap of the gasket and parts bearing upon the abutment and the gasket supporting face inwardly of the gasket, and fastening means engaged through the clamping strips for urging them toward the gasket supporting face.

6. A refrigerator consisting of a cabinet having an interior metallic lining and an exterior metallic casing, a framework connecting the interior lining and the exterior casing, and a gasket having a portion inserted in said framework in such a manner that the outer metallic casing is entirely outside of the gasket and the inner metallic lining entirely inside of the gasket; a door comprising an outer metallic casing and an inner metallic lining, and a framework of non-heat-conducting material arranged to contact with the gasket.

7. A refrigerator comprising two parts, one a cabinet having an opening, the other a closure for the opening, each of the parts having an interior metallic lining, an exterior metallic casing, and a framework for maintaining the lining and casing in spaced relation, one of the parts incorporating a gasket in the framework and means for placing said gasket under tension whereby to allow for some degree of contraction and expansion of the contiguous parts without impairing the clamping action, said gasket being adapted to bear exclusively against the framework of the other part when the door is closed 8. In a refrigerator the combination of a cabinet having a door opening in its wall, a gasket having an attaching part embedded within the wall about said opening and incorporating a compressible bead that protrudes a material distance beyond the front surface of said wall, means for placing said compressible bead under tension whereby to allow for some degree of contraction and expansion of the contiguous parts, and a door supported in operative relation to the cabinet and having a peripheral portion opposed to the front surface of the aforesaid wall for engaging and compressing said bead.

9. In a refrigerator, the combination of a cabinet having a door opening and a door for closing the same, a gasket disposed about the door opening and comprising a compressible bead and an attaching flap, clamping strips bearing against said attaching flap and means for tensioning said clamping strips to place said bead and attaching flap under tension whereby to effectively clamp the gasket in place and to allow for some degree of contraction and expansion of the contiguous parts without impairing the clamping action.

10. In a refrigerator, the combination of a cabinet having a door opening and a door for closing the same, a gasket disposed about the door opening and comprising a compressible bead and an attaching flap, clamping strips bearing against said attaching flap and means for tensioning said clamping strips to place said bead and attaching flap under tension whereby to effectively clamp the gasket in place and to allow for some degree of contraction and expansion of the contiguous parts without impairing the clamping action, said gasket being made up of a relatively soft pliable multistrand cord about which is wrapped a strip of rubberized fabric which is stitched adjacent the cord to provide an envelope therefor.

11. In a refrigerator, the combination of a cabinet having a door opening and a door for closing the same, a gasket disposed about the door opening and comprising a compressible bead and an attaching flap, clamping strips bearing against said attaching flap and means for tensioning said clamping strips to place said bead and attaching flap under tension whereby to effectively clamp the gasket in place and to allow for some degree of contraction and expansion of the contiguous parts without impairing the clamping action, said clamping strip having front edges which engage with said flap and having inclined faces whereby the same may be wedged against said gasket.

12. In a refrigerator, the combination of a cabinet having a door opening and a door for closing the same, a gasket disposed about the door opening and comprising a compressible bead and an attaching flap, clamping strips bearing against said attaching flap and means for tensioning said clamping strips to place said bead and attaching flap under tension whereby to effectively clamp the gasket in place and to allow for some degree of contraction and expansion of the contiguous parts without impairing the clamping action, said gasket being made up of a relatively soft pliable multi-strand cord about which is wrapped a strip of rubberized fabric which is stitched adjacent the cord to provide an envelope therefor, said clamping strip having front edges which engage with said flap and having inclined faces whereby the same may be wedged against said gasket.

13. In a refrigerator, the combination of a cabinet including a door frame having an angular recess therein, a gasket disposed about said door frame and comprising a bead and an attaching flap which projects into said recess, an angular clamping strip disposed within said recess and bearing against said attaching flap throughout substantially its full length, means for causing a wedging action between said clamping strip and flap whereby to place said bead and flap under tension and to effectively secure the gasket in place and to allow for some degree of contraction and expansion of the contiguous parts without impairing the clamping action.

14. In a refrigerator, the combination of a cabinet including a door frame having an angular recess therein, a gasket disposed about said door frame and comprising a bead and an attaching flap which projects into said recess, an angular clamping strip disposed within said recess and bearing against said attaching flap throughout substantially its full length, means for causing a wedging action between said clamping strip and flap whereby to place said bead and flap under tension and to effectively secure the gasket in place and to allow for some degree of contraction and expansion of the contiguous parts without impairing the clamping action, said gasket comprising a relatively soft multi-strand cord about which is secured an envelope of fabric which is stitched adjacent the cord so as to provide an attaching flap.

15. In a refrigerator, the combination of a cabinet including a door frame having an angular recess therein, a gasket disposed about said door frame and comprising a bead and an attaching flap which projects into said recess, an angular clamping strip disposed within said recess and bearing against said attaching flap through substantially its full length, means for causing a wedging action between said clamping strip and flap whereby to place said bead and flap under tension and to effectively secure the gasket in place and to allow for some degree of contraction and expansion of the contiguous parts without impairing the clamping action, said gasket comprising a relatively soft multi-strand cord about which is secured an envelope of fabric which is stitched adjacent the cord so as to provide an attaching flap, said refrigerator having a metal covering and a liner, said gasket being spaced from the liner and arranged so as to insulate the metallic covering from the inside of the cabinet.

In testimony whereof, we hereunto affix our signatures.

LEE S. CHADWICK.
CLARENCE T. SORENSEN.